Patented Feb. 20, 1923.

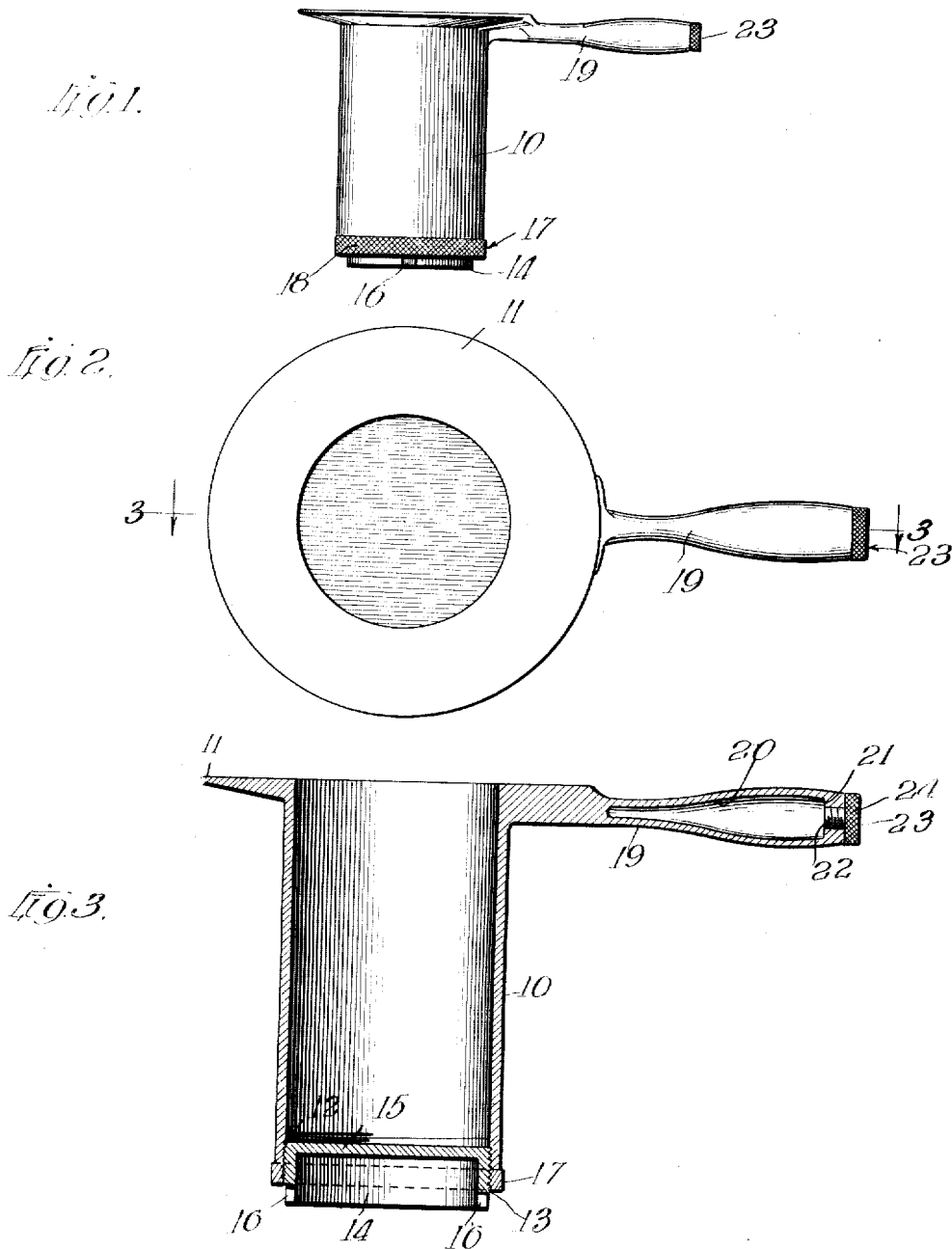

1,445,789

UNITED STATES PATENT OFFICE.

JULIUS JOHN MOJONNIER, OF OAK PARK. ILLINOIS, ASSIGNOR, BY MESNE ASSIGNMENTS, TO MOJONNIER BROS. CO., OF CHICAGO, ILLINOIS; A CORPORATION OF ILLINOIS.

ICE-CREAM TEST CUP.

Application filed June 4, 1918. Serial No. 238,183.

*To all whom it may concern:*

Be it known that I, JULIUS JOHN MOJONNIER, a citizen of the United States, and a resident of Oak Park, in the county of Cook and State of Illinois, have invented certain new and useful Improvements in Ice-Cream Test Cups, of which the following is a specification.

This invention relates to ice cream test cups, having particular reference to test cups utilized for the purpose of determining the quantity or percentage of air in ice cream, and has for its object a cup wherein the volumetric content thereof may be determined with minute accuracy through the agency of a wide outstanding flange at its upper end. This flange is constructed with sharp angles at its inner and outer edges and in service a spatula moved over the flange face readily removes all surplus material and accurately and uniformly determines the upper limit of the cup contents. Preferably the cup also has a minutely adjustable bottom by which the lower limit of the cup contents is variably determined. Another object is to construct the cup so that the material at the edges of the flange will not adhere thereto, but will readily drop off and will drop clear of the cup body. This is accomplished by employing a relatively wide outstanding flange, by having the flange faces meet at the outer edge in sharp angles and by causing the under flange face to recede rapidly from the outer edge of the flange.

With the above and other objects in view, as will be apparent, this invention consists in the construction, combination and arrangement of parts, all as hereinafter more fully described, claimed and illustrated in the accompanying drawings, wherein—

Fig. 1 is a side elevation of a cup constructed in accordance with the present invention;

Fig. 2 is a plan view thereof; and

Fig. 3 is a central vertical section taken along line 3—3 of Fig. 2 to illustrate the means for counterpoising the cup and also for varying the volumetric content thereof without affecting the weight.

A cup of the character of the present invention is fundamentally designed for use in laboratories or other places where very accurate determinations by weight are accomplished. Hence, to determine the contents of a cup accurately and positively by weight, the weight of the cup empty is deducted from the weight of the cup and its contents. The accuracy of this calculation is very obviously predicated upon knowledge of the exact weight of the cup empty. In view of the fact that even under extraordinary manufacturing conditions it has been practically and commercially impossible to produce a series of cups of this character, all of which will weigh approximately the same without any measurable or appreciable variance, and in view of the fact that in using cups it is impractical to individually weigh each cup each time it has been used, a counterpoise individual to each particular cup has been provided so that by placing the empty cup on one side of the balance and its particular counterpoise on the other side of the balance, the weight of one would exactly equalize the other. Thus the weight of the contents of any cup was accurately and exactly determined by the weight it was necessary to add to the counterpoise side of the balance to equalize the weight of the dish and its contents. The present invention is designed to provide a means whereby a standard weight may be selected for all of the cups produced, and each cup brought to the exact standard by means of a counterpoise within the cup itself.

In the manufacture of ice cream, the milk and cream used as well as the other ingredients which go to make up the mix, are in nearly all instances purchased by weight, whereas the product, viz, the ice cream, is sold by bulk. Therefore, the mix is whipped prior to or during the freezing so that it increases in bulk by the admission and mixture of air therein. Hence by weighing a given volume of mix and later weighing the same volume of ice cream, the loss in the weight of this same volume determines the amount of air in the product. The present invention is part of an apparatus especially designed for testing the overrun or amount of air in ice cream, and in view of the variance in the specific gravity, a given weight, for instance 500 grams, of different mixtures, will occupy different volumes, and hence it is necessary to vary the volumetric content of the cup constituting the present invention. This cup is used primarily to receive five hundred grams by weight of mix, which will occupy a certain given and determined volume within the cup. Then during the freezing process the cup is again filled with the product, viz, ice cream, and again weighed. By comparing the weight of the mix to the weight of the same volume of ice cream, the percentage of air in the ice cream is accurately determined.

Reference being had more particularly to the drawings, 10 designates the cylindrical body of the cup provided with an outstanding horizontal flange 11 at the upper end thereof, the outer surface of said flange being coplanar with the upper terminal of the cylindrical body 10 of the cup. At its lower end of the cylindrical body 10 of the cup is interiorly threaded as at 12 for co-operating with the threads 13 formed on the flange 14 which extends laterally and circumferentially from the bottom 15 of the cup. The outer edge of this flange 14 is provided with diametrically opposed recesses 16 whereby a tool may be engaged and the flange and bottom rotated within the cup, thereby changing the position of the bottom 15 relative to the cylindrical body 10 of the cup, by means of the threads 12 and 13. After the bottom 15 has been properly adjusted and positioned, the same is retained from movement by means of the locking ring 17 operable on the threads 13 of the flange 14 whereby it may be rotated on said flange to bear against the lower end of the cylindrical body 10 to lock the bottom 15 and flange 14 from movement. The exterior surface of this locking ring 17 is knurled as at 18 in order that it may be readily grasped and adjusted.

In order to manipulate the cup, a handle 19 is formed thereon adjacent to the flange 11 said handle merging into said flange, but not in any way interfering with the plane outer surface of said flange. This handle 19 is provided with a cavity 20 which terminates in an inwardly extending orificed flange 21 at the outer terminal of said handle. The orifice of this flange 21 is internally threaded for co-operation with the threads on the shank 22, which acts as a closure for said orifice, and consequently for the cavity 20 of the handle 19. An operating head 23 is provided for the shank 22 and is provided with a knurled periphery 24 whereby the same may be readily operated for obtaining access to the cavity in the handle or preventing access thereto.

By the provision of the adjustable bottom 15 for the cylindrical body 10 of the cup, the volumetric content of the cup above said bottom 15 may be readily varied within the limits of adjustment of said bottom without affecting the weight of the cup in any manner whatsoever.

The cavity 20 of the handle 19 is provided for the purpose of counterpoising the cup in order that a standard weight for the cup may be acquired and maintained. By removing the shank 22 from the orifice of the flange 21, lead or other weighty material in any desired or practical form may be placed in the cavity 20 of the handle 19, thus bringing the weight of the entire structure up to a predetermined and given standard.

In the manipulation of the cup the flange 11 is provided, and it will be noted from the drawings that this flange 11 is relatively wide, for the purpose of preventing any dripping from the top of the cup to the exterior wall of the body of the cup, and also to provide an accurate guide for a spatula used in leveling the contents of the cup even with the outer surface of the flange.

In this manner even a slight variance in the volumetric content of the cup above the bottom 15 is prevented, because by using a spatula operating against the outer surface of the flange 11 the contents will always be fixed at the same predetermined level.

What is claimed is:

1. A cup comprising an upright body having a closed bottom at its lower end and a relatively wide outstanding flange at its upper end, the upper face of said flange lying in a horizontal plane whereby a spatula may be used to readily strike off all material extending above said plane, said upper face meeting the inner surface of the body in a sharp angle whereby a clean and uniform cut is made each time the spatula is used and the amount of material left in the cup is thereby accurately and uniformly determined, the under face of said flange receding rapidly from the outer edge of the flange and leaving a relatively thin outer edge and the outer surface of the edge meeting said upper and under flange faces in sharp angles whereby any surplus material at the edge of the flange readily drops from the flange and drops clear of the body.

2. An adjustable measuring cup comprising an upright body, a bottom having a nice threaded adjustment in said body whereby the lower limit of the cup contents may be minutely and accurately determined, a relatively wide outstanding flange at the upper end of said body, the upper face of said flange lying in a horizontal plane whereby a spatula may be used to readily strike off material extending above said plane to determine the upper limit of the cup contents, said upper face and the inner surface of the container meeting at a sharp angle to insure a clean cut by the spatula with a resulting accurate and uniform cup content, and the lower face of the flange receding rapidly from the outer edge of the flange and the peripheral face of said edge meeting both flange faces in sharp angles whereby the surplus material at the edge of the flange readily drops from the flange and drops clear of the body.

JULIUS JOHN MOJONNIER.

Certificate of Correction.

It is hereby certified that in Letters Patent No. 1,445,789, granted February 20, 1923, upon the application of Julius John Mojonnier, of Oak Park, Illinois, for an improvement in "Ice-Cream Test Cups," an error appears in the printed specification requiring correction as follows: Page 2, line 25, strike out the word "of", first occurrence; and that the said Letters Patent should be read with this correction therein that the same may conform to the record of the case in the Patent Office.

Signed and sealed this 20th day of March, A. D., 1923.

[SEAL.]
KARL FENNING,
*Acting Commissioner of Patents.*